United States Patent
Sarkar et al.

(10) Patent No.: US 11,442,467 B2
(45) Date of Patent: Sep. 13, 2022

(54) METHOD AND SYSTEM FOR GENERATING A TRAJECTORY FOR NAVIGATING AN AUTONOMOUS VEHICLE

(71) Applicant: Wipro Limited, Bangalore (IN)

(72) Inventors: Manas Sarkar, Barasat (IN); Balaji Sunil Kumar, Bengaluru (IN)

(73) Assignee: Wipro Limited, Bangalore (IN)

( * ) Notice: Subject to any disclaimer, the term of this patent is extended or adjusted under 35 U.S.C. 154(b) by 129 days.

(21) Appl. No.: 16/690,296

(22) Filed: Nov. 21, 2019

(65) Prior Publication Data
US 2020/0310462 A1  Oct. 1, 2020

(30) Foreign Application Priority Data
Mar. 29, 2019 (IN) .............................. 201941012664

(51) Int. Cl.
*G05D 1/02* (2020.01)
*G01C 21/34* (2006.01)

(52) U.S. Cl.
CPC ....... *G05D 1/0278* (2013.01); *G01C 21/3476* (2013.01); *G05D 1/0219* (2013.01); *G05D 1/0223* (2013.01)

(58) Field of Classification Search
CPC .. G05D 1/0278; G05D 1/0219; G05D 1/0223; G01C 21/3476
See application file for complete search history.

(56) References Cited

U.S. PATENT DOCUMENTS

| | | |
|---|---|---|
| 2013/0211656 A1 | 8/2013 | An |
| 2017/0090478 A1 | 3/2017 | Blayvas et al. |
| 2018/0188049 A1* | 7/2018 | Shi ............... G01C 21/3484 |
| 2018/0345963 A1* | 12/2018 | Maura ............... G05D 1/0223 |
| 2019/0235513 A1* | 8/2019 | Li ............... G08G 1/0145 |
| 2019/0346845 A1* | 11/2019 | Rottkamp ......... B62D 15/0265 |

\* cited by examiner

*Primary Examiner* — Faris S Almatrahi
*Assistant Examiner* — Sahar Motazedi
(74) *Attorney, Agent, or Firm* — Finnegan, Henderson, Farabow, Garrett & Dunner, LLP

(57) ABSTRACT

Disclosed subject matter relates to field of vehicle navigation system that performs a method of generating trajectory for navigating an autonomous vehicle. A trajectory generating system associated with autonomous vehicle detects Points of Interest (POIs) for a selected segment which is at predefined distance from current position of autonomous vehicle, in real-time. Further, features of each of the POIs are determined and first level trajectory is generated for selected segment based on features of POIs proximal to selected segment. Furthermore, the trajectory generating system generates second level trajectory for portions of first level trajectory from current position of autonomous vehicle by modifying each portion based on real-time environment data. First level trajectory in present disclosure enables trajectory generating system to effectively plan the second level trajectory such that, sudden change in velocity or direction of autonomous vehicle is eliminated, when autonomous vehicle encounters infrastructure conditions present in the selected segment.

18 Claims, 10 Drawing Sheets

| Point Of Interest (POI)/ infrastructure information | Parameter Value | Priority value | Usage of the parameter value |
|---|---|---|---|
| Speed limit | Speed Value | 1 | Trajectory planning with a specified velocity |
| Hump/Speed breaker | Hump position, height, span | 1 | Slowing down to 5km/hr until the hump is reached. Then generate a specific velocity, acceleration plan. |
| No honk sign | Position | 2 | Slow velocity planning, with a possibility of quick stop. |
| Sharp turn | Distance of turn | 2 | Slowly approaching the sharp turn |
| Traffic Diversion/ merging point ahead | Distance of beginning of diversion | 2 | Slowing down velocity plan, until vehicle reaches 5-meters close to the point. |
| Keep left information board | Flag property | 2 | No overtaking trajectory planning. Velocity plan following vehicle ahead. |
| Market | Get market start position and end position | 3 | Plane slow moving trajectory. |
| School zone | Get school start position and end position | 3 | Plane slow moving trajectory. |
| Rail crossing | Stop position before rail crossing | 2 | Slowing down velocity plan (considering possible rail gate close). |
| Bad road | Length information of bad stretch | 4 | Slow moving velocity planning. |
| Day or light condition | Situational info | 4 | Velocity at night may be less however in specific conditions such as an empty place (schools) or busy place (evening market or gathering for a public function) |

FIG.2B

| Point Of Interest (POI)/ infrastructure information | Parameter Value | Priority value | Usage of the parameter value |
|---|---|---|---|
| POI 241a - Market | Market start position: $(X_1,Y_1)$ and end position: $(X_2,Y_2)$ | 3 | Plane slow moving trajectory. |
| POI 241b – No honk | Position: $(X_3,Y_3)$ | 2 | Slow velocity plan, with a possibility of quick stop. |
| POI 241c - Hump | Hump position: $(X_4,Y_4)$ Hump height: 3 inches Hump Span: 5metres | 1 | Slowing down to 5km/hr until the hump is reached. Then generate a specific velocity, acceleration plan. |
| POI 241d – Rail crossing | Stop position before rail crossing: $(X_5,Y_5)$ | 2 | Slowing down velocity plan (considering possible rail gate to be closed) |

FIG.2G

METHOD AND SYSTEM FOR GENERATING A TRAJECTORY FOR NAVIGATING AN AUTONOMOUS VEHICLE

TECHNICAL FIELD

The present subject matter relates generally to the field of vehicle navigation system, and more particularly, but not exclusively to a method and a system for generating a trajectory for navigating an autonomous vehicle.

BACKGROUND

Nowadays, navigation path is widely used in autonomous vehicle technology for navigating autonomous vehicles. The autonomous vehicles are the vehicles that are capable of sensing environment around them for moving on the road without any human intervention. The autonomous vehicles sense the environment with help of sensors configured to work in systems such as Light Detection and Ranging (LIDAR) system, Image capturing devices, Global Positioning System (GPS) and the like. To navigate along the navigation path, the autonomous vehicles depend on trajectory planning systems. Trajectory planning generally includes real-time planning of transition of the autonomous vehicle from one feasible state to another feasible state, while complying with kinematic limits based on dynamics of the autonomous vehicle. Trajectory planning is parameterized by time as well as acceleration or velocity.

Few existing techniques disclose trajectory planning systems that generate different trajectories based on situation on cross sections of a road, road boundaries, obstacles on the road and trajectory of other moving objects on the road. Based on cost of the generated trajectories, the existing techniques may select the best trajectory for navigation. Few other existing techniques disclose dynamic adjustment of trajectory based on any of the parameters or features such as energy consumption, end time, shortest distance from each obstacle, average shortest distance from all the obstacles, length of track, maximum speed, maximum steering speed and the like. These existing techniques solve the problem related to energy consumption by generating a trajectory such that minimum energy is consumed to navigate the autonomous vehicles. Yet other existing techniques disclose autonomous navigation systems that facilitate motion of the autonomous vehicle in a way that minimizes constrained movement of the autonomous vehicle. To achieve the above mentioned objective, the existing techniques determine cost along each possible movement planned for the autonomous vehicle and select the movement involving least cost for navigating the autonomous vehicle.

However, in all the above mentioned existing techniques, the trajectory or the movement of the autonomous vehicle is planned in real-time based on both static infrastructure conditions and dynamic environment conditions when the autonomous vehicle physically reaches that position. Therefore, the existing techniques may require sudden changes in velocity and direction of the autonomous vehicle to meet static infrastructure conditions and dynamic environment conditions on the road. Such sudden changes in velocity and direction of the autonomous vehicles that occur due to lack of prior knowledge of the static infrastructure conditions of the road may damage parts of the autonomous vehicle. Further, the autonomous vehicle may also experience frequent jerks while navigating, thus resulting in an uncomfortable drive. Further, since both static infrastructure conditions and dynamic environment conditions data has to be processed when vehicle reaches that position, time take to process such data is more.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating a trajectory for navigating an autonomous vehicle. The method includes detecting, by a trajectory generating system associated with an autonomous vehicle, one or more Points of Interest (POIs) for a selected segment, on a pre-generated navigation path, in real-time. The selected segment is at a predefined distance from current position of the autonomous vehicle. Further, the method includes determining features of each of the one or more POIs. The features include at least one of, one or more parameter values and a corresponding priority value. Upon determining the features, the method includes generating a first level trajectory for the selected segment at an end of previously generated trajectory based on the features of each of the one or more POIs proximal to the selected segment, in real-time. Finally, the method includes generating a second level trajectory for one or more portions of the first level trajectory beginning from the current position of the autonomous vehicle, by modifying each of the one or more portions of the first level trajectory based on real-time environment data.

Further, the present disclosure includes a trajectory generating system for generating a trajectory for navigating an autonomous vehicle. The trajectory generating system includes a processor and a memory communicatively coupled to the processor. The memory stores the processor-executable instructions, which, on execution, causes the processor to detect one or more Points of Interest (POIs) for a selected segment, on a pre-generated navigation path, in real-time. The selected segment is at a predefined distance from current position of the autonomous vehicle. Further, the processor determines features of each of the one or more POIs. The features comprises at least one of, one or more parameter values and a corresponding priority value. Upon generating the features, the processor generates a first level trajectory for the selected segment at an end portion of previously generated trajectory based on the features of each of the one or more POIs proximal to the selected segment, in advance, before vehicle is about to reach there. Finally, the processor generates a second level trajectory for one or more portions of the first level trajectory beginning from the current position of the autonomous vehicle, by modifying each of the one or more portions of the first level trajectory based on real-time environment data.

Furthermore, the present disclosure relates to a non-transitory computer readable medium including instructions stored thereon that when processed by at least one processor cause a trajectory generating system to perform operations comprising detecting one or more Points of Interest (POIs)

for a selected segment, on a pre-generated navigation path, in real-time. The selected segment is at a predefined distance from current position of the autonomous vehicle. Further, the instructions cause the trajectory generating system to determine features of each of the one or more POIs. The features comprise at least one of, one or more parameter values and a corresponding priority value. Upon generating the features, the instructions cause the trajectory generating system to generate a first level trajectory for the selected segment at an end portion of previously generated trajectory based on the features of each of the one or more POIs proximal to the selected segment, in advance, before vehicle is about to reach there. Finally, the instructions cause the trajectory generating system to generate a second level trajectory for one or more portions of the first level trajectory beginning from the current position of the autonomous vehicle, by modifying each of the one or more portions of the first level trajectory based on real-time environment data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2B shows a table including exemplary POIs and features of the exemplary POIs in accordance with some embodiments of the present disclosure;

FIG. 2G shows a table including exemplary feature data of exemplary POIs in accordance with some embodiments of the present disclosure;

Figure 1:
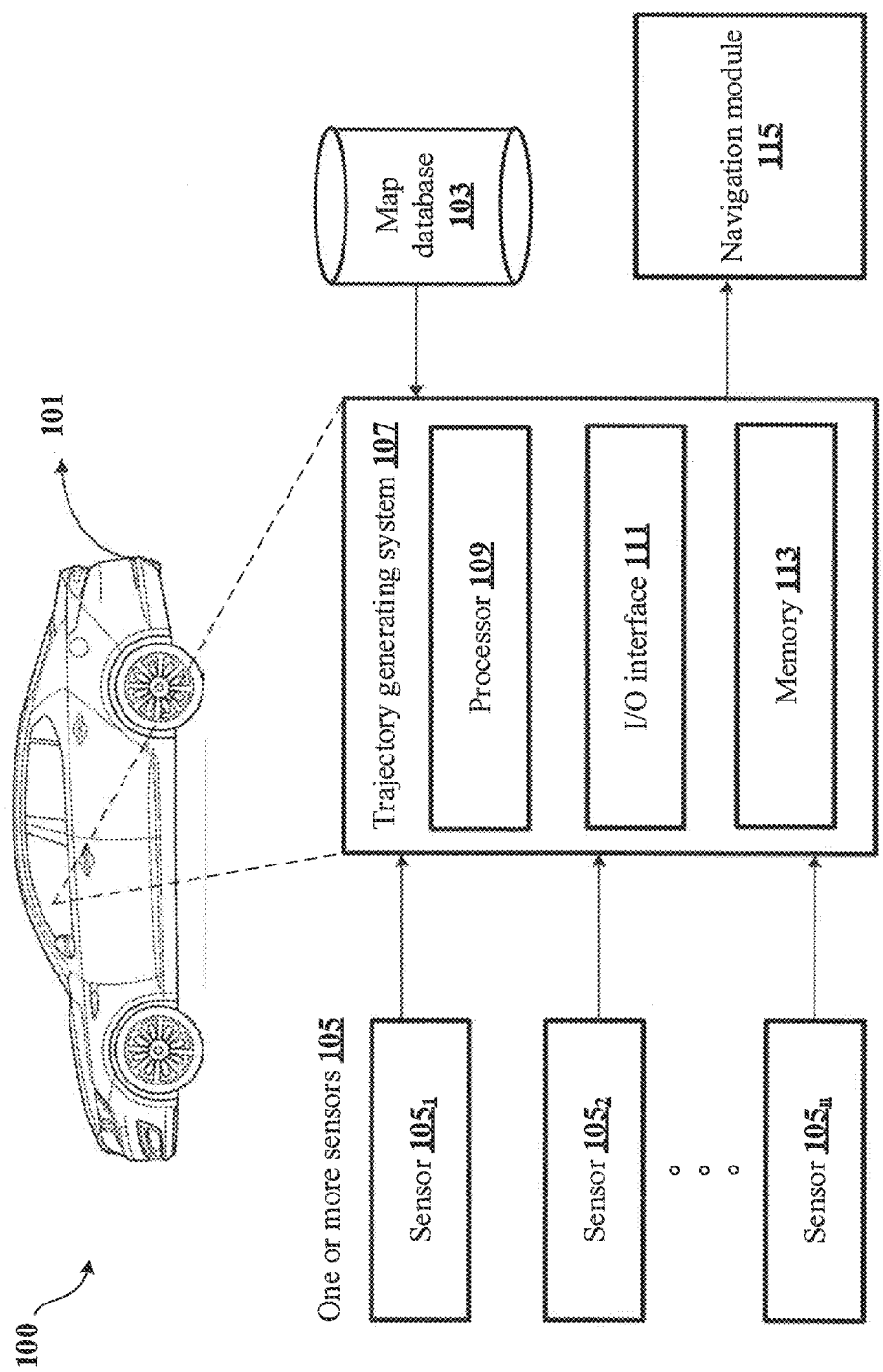
FIG. 1 shows an exemplary architecture for generating a trajectory for navigating an autonomous vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating a trajectory for navigating an autonomous vehicle. A trajectory determining system may detect one or more Points of Interest (POIs) for a selected segment, on a pre-generated navigation path, in real-time. In some embodiments, the selected segment may be present at a predefined distance from current position of the autonomous vehicle. The one or more POIs may provide static infrastructure information related to roads. Further, the trajectory determining system may determine features of each of the one or more POIs. The features may include, but are not limited to, one or more parameter values and a corresponding priority value. Upon generating the features, the trajectory determining system may generate a first level trajectory for the selected segment at an end portion of previously generated trajectory. In some embodiments, the first level trajectory may be determined based on the features of each of the one or more POIs proximal to the selected segment, in real-time. Further, the trajectory determining system may dynamically divide the first level trajectory into one or more portions. The trajectory generating system may divide first level trajectory into the one or more portions by consecutively extending the first level trajectory based on location of the one or more POIs parallelly when the second level trajectory is being generated. In some embodiments, the trajectory generating system may generate the second level trajectory for the one or more portions of the first level trajectory beginning from the current position of the autonomous vehicle by modifying each of the one or more portions of the first level trajectory based on real-time environment data.

The present disclosure utilizes static infrastructure information which is present in map database which is communicatively interfaced with the trajectory generating system, for generating a first level trajectory. The first level trajectory is generated when the autonomous vehicle is at a predefined distance from the selected segment where the first level trajectory is determined. This first level trajectory sets a base and a velocity threshold for the navigation of the autonomous vehicle. Therefore, when the autonomous vehicle is at the selected segment, a second level trajectory may be generated complying with the velocity threshold, by modifying the first level trajectory based on real-time environment data. This two-level trajectory generation ensures that the autonomous vehicle is well prepared to face the infrastructural conditions such as humps, railway crossing, market zone and the like even before encountering the infrastructural conditions. Further, beforehand planning of the trajectory eliminates sudden velocity changes to the autonomous vehicle, thereby increasing life of vehicle parts and avoiding frequent jerks experienced by the autonomous vehicle.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating a trajectory for navigating an autonomous vehicle in accordance with some embodiments of the present disclosure.

The architecture 100 includes an autonomous vehicle 101, a map database 103, sensor $105_1$ to sensor $105_n$ (collectively referred as one or more sensors 105), a navigation module 115 and a trajectory generating system 107. As an example, the autonomous vehicle 101 may be a bike, a car, a truck, a bus and the like. In some embodiments, the map database 103 may include a plurality of annotated vectors related to infrastructure information. In some embodiments, the infrastructure information may be static information related to infrastructure of road forming pre-generated navigation path. In some embodiments, the map database 103 may be associated with the trajectory generating system 107 via a communication network (not shown in FIG. 1). As an example, the communication network may include a wired communication network or a wireless communication network. In some embodiments, the autonomous vehicle 101 may be configured with the one or more sensors 105. As an example, the one or more sensors 105 may include, but not limited to, Light Detection and Ranging (LIDAR) system, image capturing devices and Global Positioning System (GPS). In some other embodiments, the one or more sensors 105 may be remotely associated with the autonomous vehicle 101. Further, the one or more sensors 105 may be associated with the trajectory generating system 107 via the communication network. In some embodiments, the trajectory generating system 107 may be configured within the autonomous vehicle 101 as shown in the FIG. 1.

The trajectory generating system 107 may include a processor 109, an Input/Output (I/O) interface 111 and a memory 113. The I/O interface 111 may be configured to receive real-time environment data from the one or more sensors 105. As an example, the real-time environment data may include, but not limited to, current position of the autonomous vehicle 101, static objects such as trees, poles, rocks, and the like, and dynamic objects such as vehicles, humans, etc. that appear on a pre-generated navigation path along which the autonomous vehicle 101 is currently navigating and terrain condition along the pre-generated navigation path. In some embodiments, the one or more sensors 105 may provide static data such as static maps of locality where the autonomous vehicle 101 may navigate. Further, the processor 109 may store the real-time environment data, the static data and the pre-generated navigation path in the memory 113 coupled with the processor 109.

When the autonomous vehicle 101 is navigating along the pre-generated navigation path, the processor 109 may select a segment along the pre-generated navigation path. In some embodiments, the selected segment may be at a predefined distance from a current position of the autonomous vehicle 101, on the pre-generated navigation path. Further, the processor 109 may detect one or more Points of Interest (POIs) for the selected segment, on the pre-generated navigation path, in real-time. In some embodiments, length of the selected segment may be dynamically configured based on the one or more POIs such that, each selected segment includes at least one POI. As an example, the one or more POIs may include, but not limited to, at least one of sign boards, symbols and images related to infrastructure information along the pre-generated navigation path. As an example, a sign board indicating a speed breaker, a sign board indicating speed limit, a symbol indicating "no horn", a symbol indicating "school ahead", a symbol indicating "steep turn ahead" and the like may be the one or more POIs related to the infrastructure information. Further, the processor 109 may determine features of each of the one or more POIs. In some embodiments, the features of each of the one or more POIs may include, but not limited to, one or more parameter values and a corresponding priority value. In some embodiments, the features of the each of the one or more POIs may also include usage of the corresponding one or more POIs i.e. how information related to each of the one or more POIs may be used for navigation of the autonomous vehicle 101.

Further, the processor 109 may generate a first level trajectory for the selected segment at an end portion of previously generated trajectory based on the features of each of the one or more nearby POIs proximal to the selected segment, in real-time. In some embodiments, the previously generated trajectory may be a first level trajectory generated for a previous segment prior to the selected segment. Further, the processor 109 may generate a second level trajectory for one or more portions of the first level trajectory by modifying each of the one or more portions of the first level trajectory based on the real-time environment data. In some embodiments, the processor 109 may modify each of the one or more portions of the first level trajectory, beginning from the current position of the autonomous vehicle 101. In some embodiments, the first level trajectory is generated consecutively extending end portion of the first level trajectory based on location of the one or more POIs, parallelly when the second level trajectory is being generated in front of the autonomous vehicle 101. The extended segment of the first level trajectory may be considered as a subsequent first level trajectory on the pre-generated navigation path, for detecting subsequent POIs on the pre-generated navigation path. In some embodiments, the processor 109 may provide the second level trajectory to the navigation module 115 associated with the trajectory generating system 107 to determine a command velocity for navigating the autonomous vehicle. In some embodiments, the navigation module 115 may be associated with the trajectory generating system 107 via the communication network.

Figure 2A:
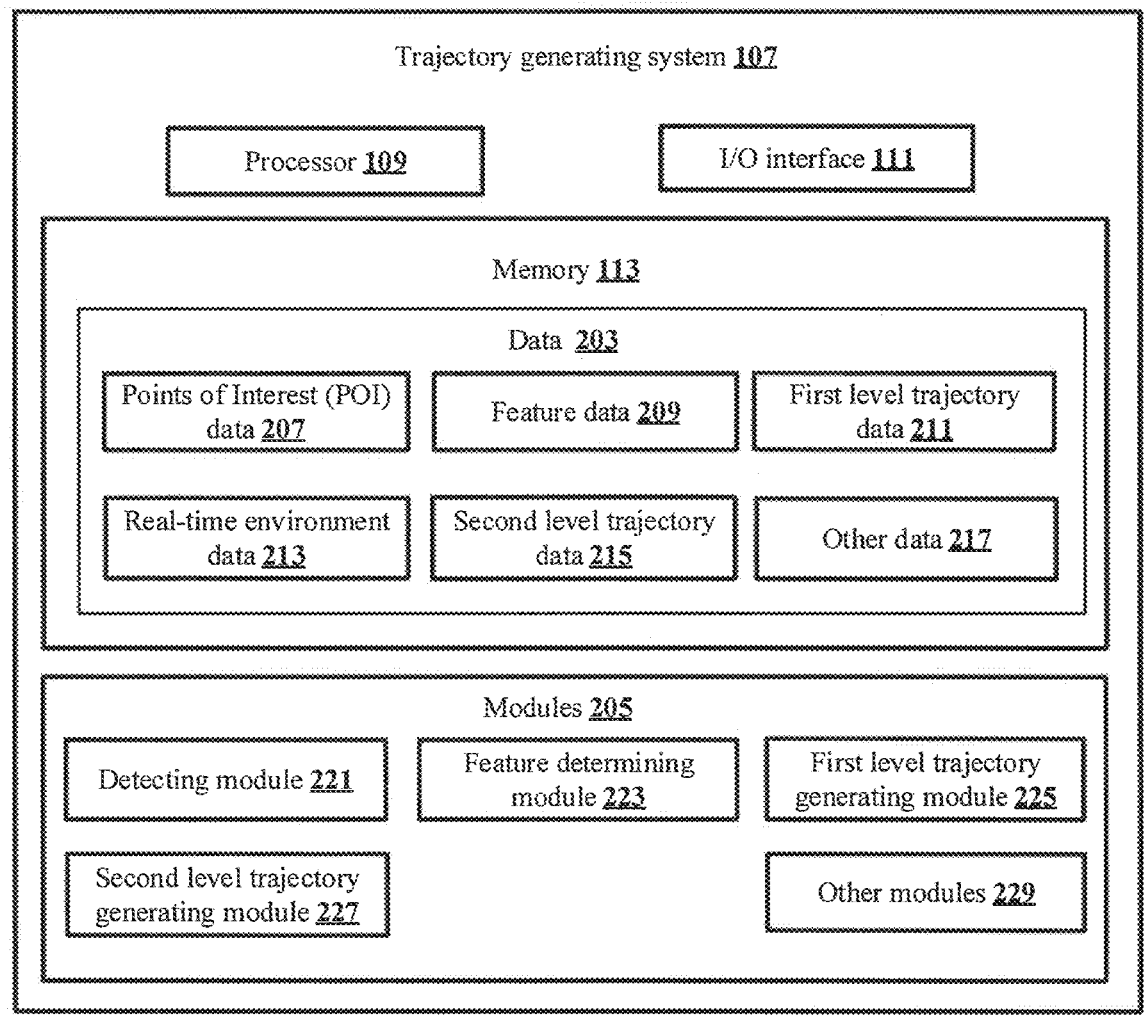
FIG. 2A shows a detailed block diagram of a trajectory generating system for navigating an autonomous vehicle in accordance with some embodiments of the present disclosure.

FIG. 2A shows a detailed block diagram of a trajectory generating system 107 for determining an optimal trajectory for navigation of an autonomous vehicle 101 in accordance with some embodiments of the present disclosure.

In some implementations, the trajectory generating system 107 may include data 203 and modules 205. As an example, the data 203 is stored in a memory 113 configured in the trajectory generating system 107 as shown in the FIG. 2A. In one embodiment, the data 203 may include Point Of Interest (POI) data 207, feature data 209, first level trajectory data 211, real-time environment data 213, second level trajectory data 215 and other data 217. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 217 may store data, including temporary data and temporary files, generated by the modules 205 for performing the various functions of the trajectory generating system 107.

In some embodiments, the data 203 stored in the memory 113 may be processed by the modules 205 of the trajectory generating system 107. The modules 205 may be stored within the memory 113. In an example, the modules 205 communicatively coupled to the processor 109 configured in the trajectory generating system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a detecting module 221, a feature determining module 223, a first level trajectory generating module 225, a second level trajectory generating module 227 and other modules 229. The other modules 229 may be used to perform various miscellaneous functionalities of the trajectory generating system 107. It will be appreciated that such aforementioned modules 205 may be represented as a single module or a combination of different modules.

In some embodiments, the detecting module 221 may detect one or more POIs for a selected segment, on a pre-generated navigation path, in real-time. In some embodiments, the pre-generated navigation path may be a path generated based on a source point and a destination point received by the processor 109. The selected segment may be a portion of the pre-generated navigation path which is at a predefined distance from current position of the autonomous vehicle 101. In some embodiments, length of the selected segment may be dynamically configured based on the one or more POIs such that, each selected segment includes at least one POI. In some other embodiments, the length of the selected segment may be predefined. As an example, the one or more POIs detected by the detecting module 221 may include, but not limited to, at least one of sign boards, symbols and images related to infrastructure information along the pre-generated navigation path. As an example, a sign board indicating a speed breaker, a sign board indicating speed limit, a symbol indicating "no horn", a symbol indicating "school ahead", a symbol indicating "steep turn ahead" and the like may be the one or more POIs related to the infrastructure information. The one or more POIs thus detected may be stored as the POI data 207. In some embodiments, the detecting module 221 may detect the one or more POIs based on a map database 103 associated with the trajectory generating system 107. In some embodiments, the map database 103 may include, but not limited to, a plurality of annotated vectors related to infrastructure information. In some embodiments, the infrastructure information may be static information related to infrastructure of road forming the pre-generated navigation path.

Further, in some embodiments, the feature determining module 223 may determine features of each of the one or more POIs. In some embodiments, the features of each of the one or more POIs may include, but not limited to, one or more parameter values and a corresponding priority value. In some embodiments, the features of the each of the one or more POIs may also include usage of the corresponding one or more POIs i.e. how information related to each of the one or more POIs may be used for navigation of the autonomous vehicle 101. Further, the feature determining module 223 may detect the one or more parameter values using the map database 103. In some embodiments, the priority value may be pre-determined based on impact of the corresponding one or more POIs on navigation of the autonomous vehicle 101. The priority value corresponding to each of the one or more POIs may be directly proportional to impact of corresponding one or more POIs on velocity-position trajectory plan of the autonomous vehicle 101. Therefore, the priority value may help in pre-analysing the impact of the one or more POIs to plan an accurate trajectory for the autonomous vehicle. FIG. 2B shows a table including exemplary POIs and features of the exemplary POIs. Referring to the table shown in FIG. 2B, consider an exemplary POI "Hump". One or more parameters and corresponding parameter values of the exemplary POI "Hump" may be:

Hump position: (X,Y);

Hump height: H units; and

Hump span: S units.

Figure 2C:
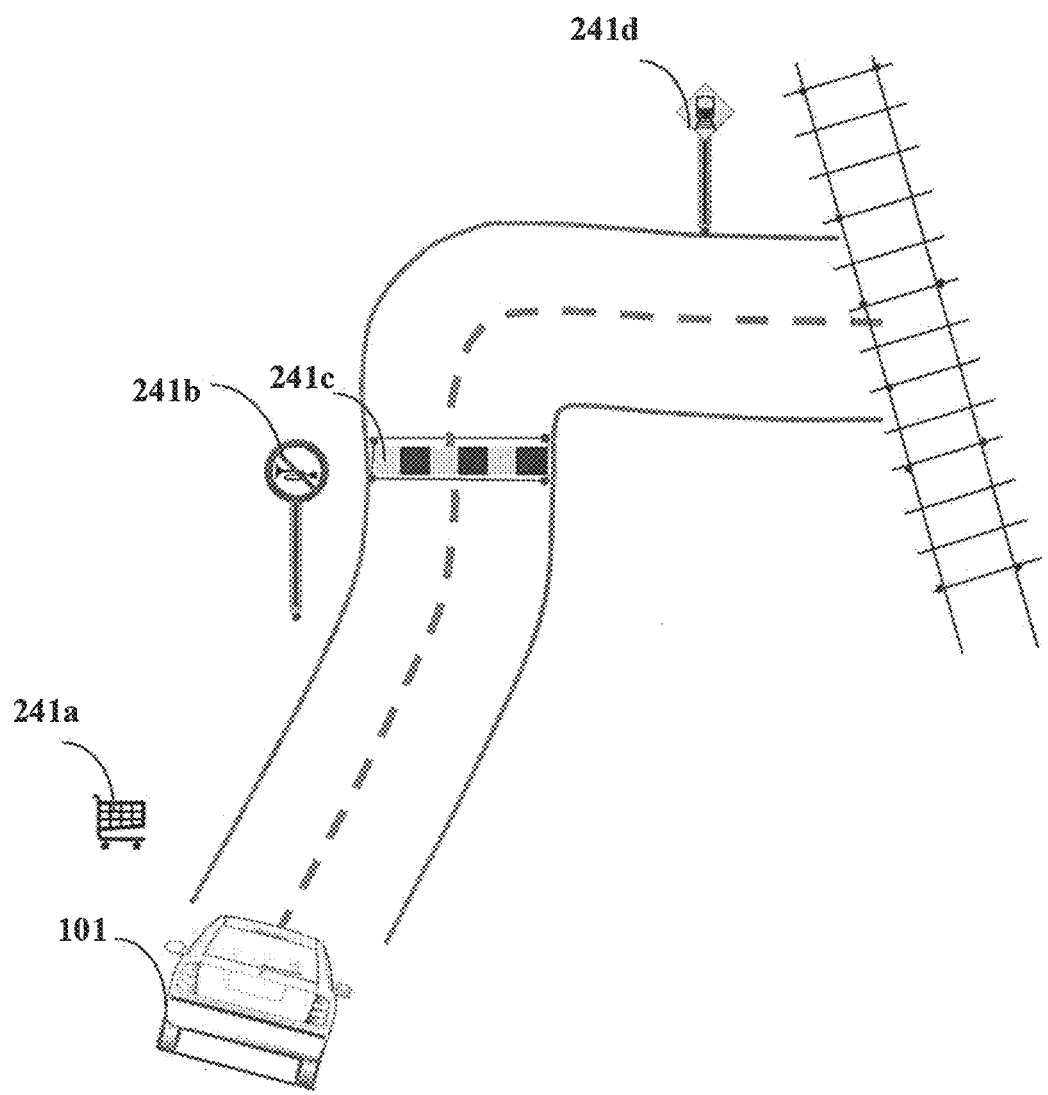
FIG. 2C shows an exemplary illustration of one or more POIs on an exemplary pre-generated navigation path in accordance with some embodiments of the present disclosure.

Further, usage of the one or more parameter values of the exemplary POI "Hump" may be to reduce speed of the autonomous vehicle 101 to nearly 5 km/hr and then generate a velocity-acceleration plan i.e. a trajectory plan for the autonomous vehicle 101. Similarly, each of the one or more POIs is associated with corresponding one or more parameters, one or more parameter values and a corresponding priority value. The features of each of the one or more POIs thus determined may be stored as the feature data 209. FIG. 2C shows an exemplary illustration of one or more POIs 241a, 241b, 241c and 241d on an exemplary pre-generated navigation path.

Further, in some embodiments, the first level trajectory generating module 225 may generate a first level trajectory for the selected segment based on the features of each of the one or more POIs proximal to the selected segment. In some embodiments, the first level trajectory generating module 225 may generate a first level trajectory at an end portion of a previously generated trajectory. In some embodiments, the previously generated trajectory may be a first level trajectory generated for a previous segment prior to the selected segment. In some embodiments, the first level trajectory generating module 225 may generate the first level trajectory for the selected segment before the autonomous vehicle 101 reaches the selected segment. In other words, the first level trajectory is generated for the selected segment, while the autonomous vehicle 101 is navigating through the previously generated trajectory of the previous segment.

In some embodiments, the first level trajectory generating module 225 may generate the first level trajectory by mapping the features of each of the one or more POIs proximal to the selected segment, with a pretrained decision tree. In some embodiments, the one or more parameter values and the priority values may be used for training the pre-trained decision tree. The pre-trained decision tree undertakes supervised learning to determine the first level trajectory. In some embodiments, pre-training may include training based on trial scenarios, and trial velocity values to overcome different types of trial scenarios using vehicles of different capabilities. In some embodiments, the first level trajectory may be velocity-acceleration plan generated for the autonomous vehicle 101 based on the one or more POIs, that enables the autonomous vehicle 101 to adapt to static infrastructural conditions on the pre-generated navigation path. Therefore, the first level trajectory i.e. the velocity-acceleration plan may act as a threshold velocity and acceleration set for the autonomous vehicle 101 while navigating through the selected segment.

Figure 2D:
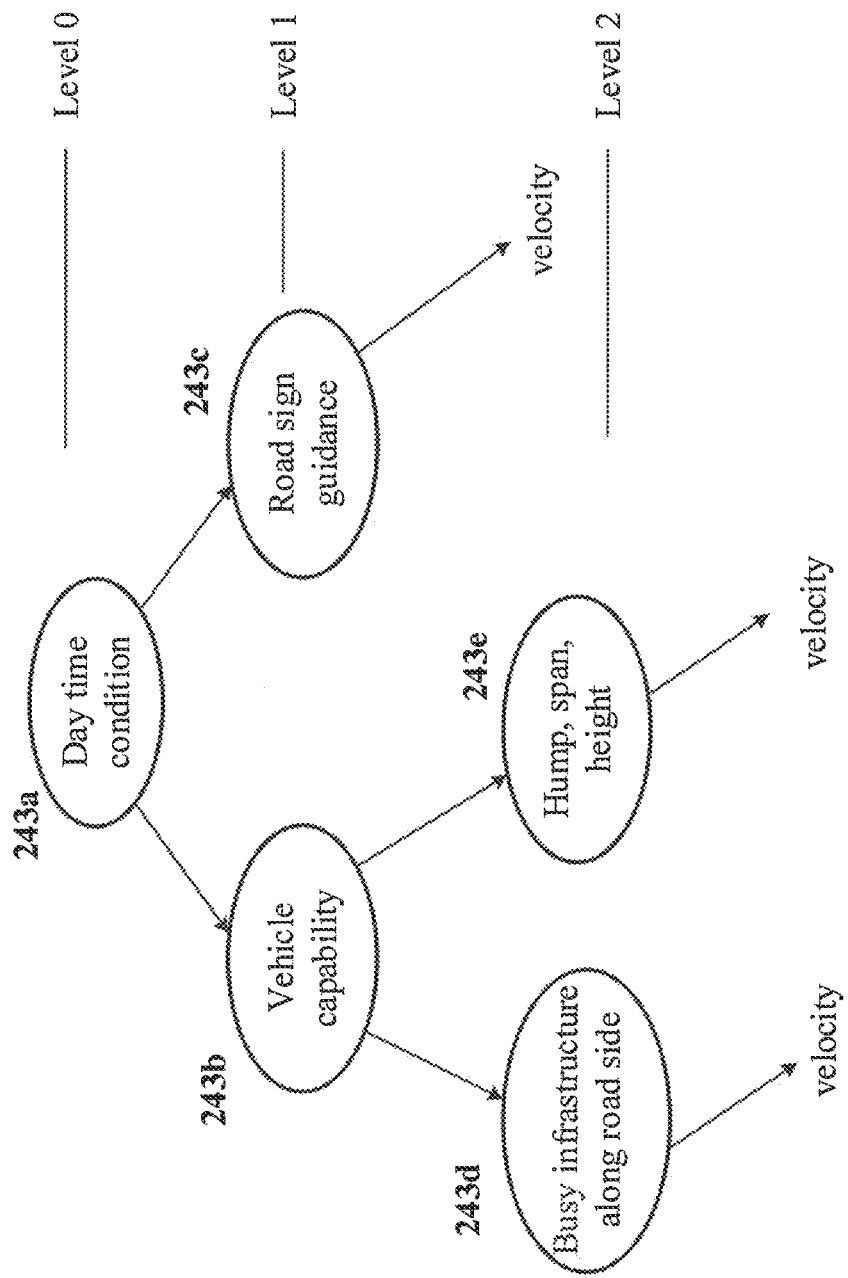
FIG. 2D shows an exemplary pre-trained decision tree in accordance with some embodiments of the present disclosure.

FIG. 2D shows an exemplary pre-trained decision tree. In the FIG. 2D, each node of the pre-trained decision tree represents a POI or in other words an infrastructure condition. Each node of the pre-trained decision tree is arranged in an ascending order of impact each POI may have on velocity and acceleration of the autonomous vehicle 101. Therefore, root node 243*a* of the pre-trained decision tree represents a less impactful POI and the nodes 243*d* and 243*e* at level 2 of the pre-trained decision tree represent high impactful POIs, while the nodes 243*b* and 243*c* represent level 1 nodes of the pre-trained decision tree. As an example, consider a scenario where the detecting module 221 has detected presence of the POI "busy market area". Therefore, according to the pre-trained decision tree, since it is daylight condition and the POI "busy market area" belongs to a busy infrastructure condition, based on the vehicle capability, the pre-trained decision tree may suggest velocity 1 for generating the first level trajectory. Similarly, the pre-trained decision tree may determine an accurate velocity based on the one or more POIs to generate the first level trajectory. In some embodiments, the first level trajectory thus generated for the selected segment may be stored as the first level trajectory data 211.

Further, in some embodiments, the second level trajectory generating module 227 may generate a second level trajectory for one or more portions of the first level trajectory beginning from the current position of the autonomous vehicle 101. The second level trajectory generating module 227 may generate the second level trajectory by modifying each of the one or more portions of the first level trajectory based on the real-time environment data 213. In some embodiments, each of the one or more portions of the first level trajectory may be a portion which is visible for Field Of View (FOV) of the one or more sensors 105. Further, as an example, the real-time environment data 213 may include, but not limited to, current position of the autonomous vehicle 101, static objects such as trees, poles, rocks etc. and dynamic objects such as vehicles, humans, etc. that appear on a planned navigation path along which the autonomous vehicle 101 is currently navigating, and terrain condition along the planned navigation path. In some embodiments, the second level trajectory generating module 227 may receive the real-time environment data 213 from one or more sensors 105 associated with the autonomous vehicle 101. As an example, the one or more sensors 105 may include, but not limited to, Light Detection and Ranging (LIDAR) system, image capturing devices and Global Positioning System (GPS).

In some embodiments, the first level trajectory generated for the selected segment is based on static information i.e. the feature data 209 related to the one or more POIs present along the pre-generated navigation path. However, when the autonomous vehicle 101 arrives at the selected segment, obstacles such as other vehicles, humans, rocks may be occur in real-time. This real-time environment data 213 may be captured by the one or more sensors 105 in real-time. Since the first level trajectory is only based on the static information, the autonomous vehicle 101 requires another trajectory (second level trajectory) which is based on the real-time environment data 213 for navigating along the selected segment. Therefore, the second level trajectory generating module 227 may modify velocity-acceleration plan defined as part of the first level trajectory based on the real-time environment data 213 in such a way that, velocity and acceleration of the second level trajectory do not exceed the velocity and the acceleration of the first level trajectory. In other words, the velocity and the acceleration of the first level trajectory act as a threshold for the velocity and the acceleration of the second level trajectory. Therefore, the second level trajectory generating module 227 may approach the selected segment portion by portion consecutively, and may modify the velocity and the acceleration of the first level trajectory of the selected segment in accordance with the real-time environment data 213. The second level trajectory thus determined may be stored as the second level trajectory data 215.

Referring to the one or more portions of the first level trajectory, in some embodiments, the first level trajectory is generated consecutively extending end portion of the first level trajectory based on location of the one or more POIs. In other words, the first level trajectory may be extended such that, extended segment of the first level segment includes at least one POI. In some embodiments, the first level trajectory generating module 225 may extend the first level trajectory parallelly when the second level trajectory is being generated for the one or more portions of the first level trajectory in front of the autonomous vehicle 101. In some embodiments, the extended segment of the first level trajectory may be considered as a subsequent first level trajectory on the pre-generated navigation path. The process of determining the subsequent second level trajectory based on the subsequent first level trajectory may continue as described above until the autonomous vehicle 101 either reaches the destination point or halts at a certain point on the pre-generated navigation path or breaks down.

Further, in some embodiments, the processor 109 may provide the second level trajectory to a navigation module 115 associated with the trajectory generating system 107 to determine a command velocity for navigating the autonomous vehicle 101. In some embodiments, the navigation module 115 may also be configured in the autonomous vehicle 101. In some embodiments, the command velocity may be a realistic velocity determined based on current velocity of the autonomous vehicle 101 and projected velocity as per the second level trajectory.

Henceforth, the process of generating a trajectory for navigating an autonomous vehicle 101 is explained with the help of one or more examples for better understanding of the present disclosure. However, the one or more examples should not be considered as limitation of the present disclosure.

Figure 2E:
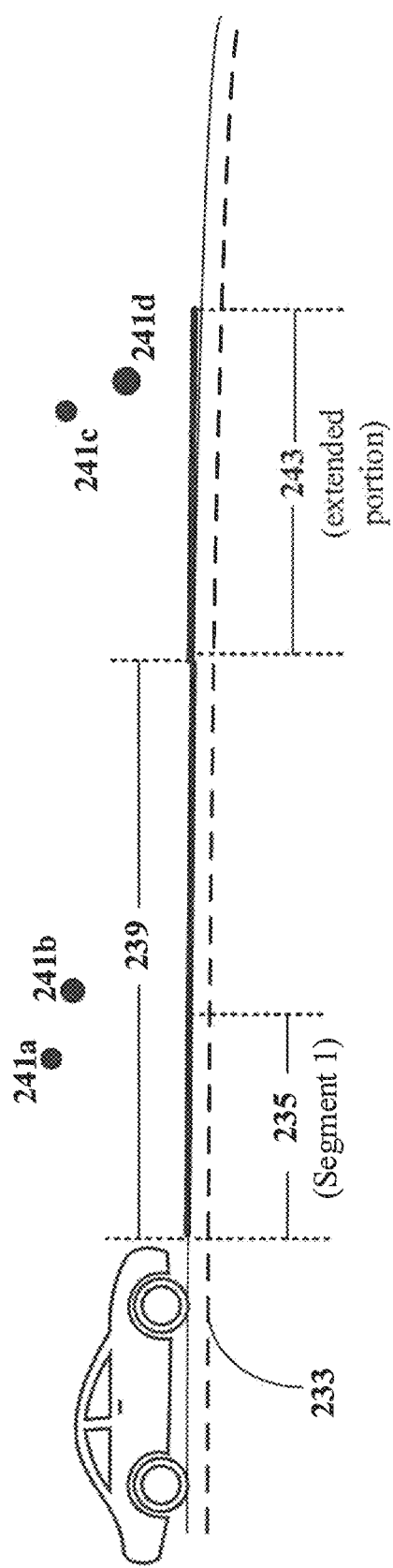
FIG. 2E and FIG. 2F show an exemplary illustration of first level trajectory and second level trajectory generation in accordance with some embodiments of the present disclosure.
Figure 2F:
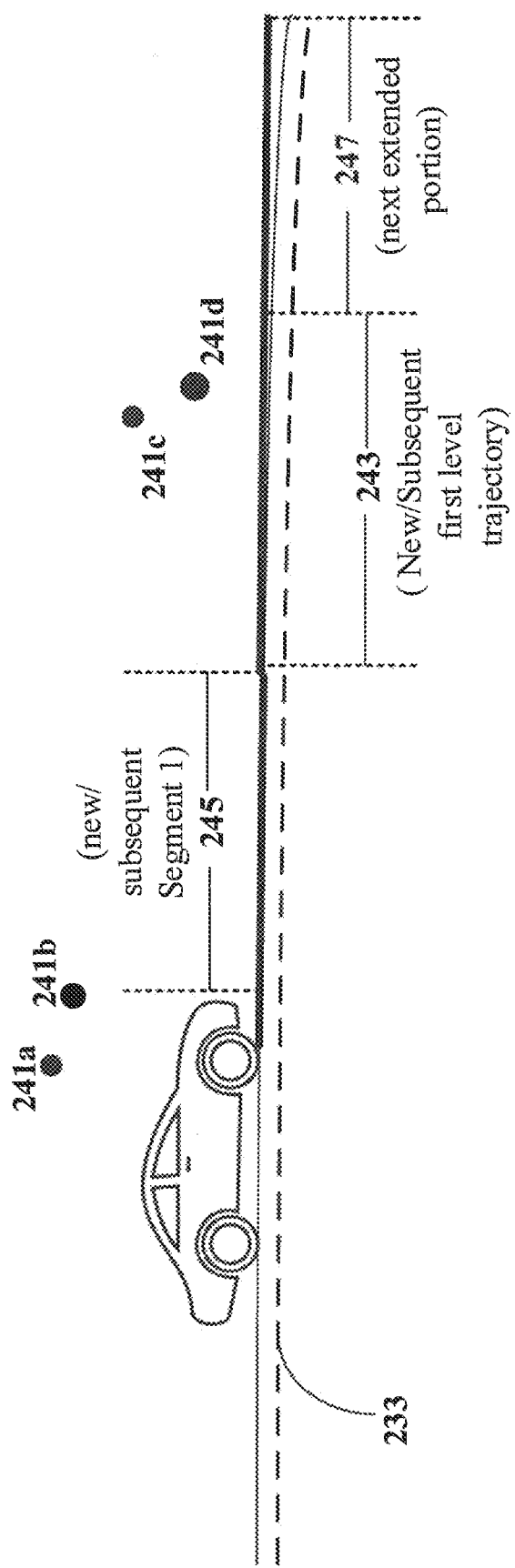

Consider an exemplary illustration as shown in the FIG. 2E. In the FIG. 2E, reference 233 indicates an exemplary pre-generated navigation path, reference 239 indicates an exemplary first level trajectory of the selected segment which may be at a distance of 30 metres from current position of the autonomous vehicle ($X_{cur}, Y_{cur}$). Further, as shown in the FIG. 2E, references 241a, 241b, 241c and 241d may indicate exemplary POIs. The exemplary feature data 209 of the exemplary POIs is shown in the table of FIG. 2G. Among the aforementioned exemplary POIs, consider the first level trajectory generating module 225 generates the exemplary first level trajectory 239 for the selected segment based on features of the exemplary POIs 241a and 241b. Consider velocity of the autonomous vehicle 101 determined according to the POI 241a and POI 241b as part of the exemplary first level trajectory 239 is 5 km/hr. Therefore, when current position ($X_{cur}, Y_{cur}$) of the autonomous vehicle 101 is at beginning of the exemplary first level trajectory 239 as shown in the FIG. 2E, the second level trajectory generating module 227 may begin with generation of the second level trajectory for the exemplary selected segment (segment 1 represented by reference 235) based on real-time environment data 213 for the segment 1 (235). In some embodiments, segment 1 (235) may be first portion of the first level trajectory 239 which is visible for Field Of View (FOV) of the one or more sensors 105. Simultaneously, end portion of the exemplary first level trajectory 239 may extend until at least one POI is detected, for example, say exemplary POI 241c and POI 241d are detected at a certain distance, for example, 25 m from end portion of the exemplary first level trajectory 239. Therefore, the stretch of 25m represented by reference 243 is the exemplary extended segment of the exemplary first level trajectory 239. Therefore, while the autonomous vehicle 101 is navigating through the second level trajectory generated for segment 1 (235), the exemplary first level trajectory 239 may be parallelly extended from end portion of the exemplary first level trajectory 239. Therefore, as shown in FIG. 2F, at this point, the extended segment 243 may be considered as the subsequent or new first level trajectory, while the portion in front of the current position of the autonomous vehicle 101 represented by reference 245 may be considered as the new or subsequent segment 1 for generation of the second level trajectory. Further, reference 247 represents next extended segment when the autonomous vehicle 101 is navigating through the second level trajectory generated for segment represented by reference 245. This process may continue till the autonomous vehicle 101 reaches a destination point.

Figure 3:
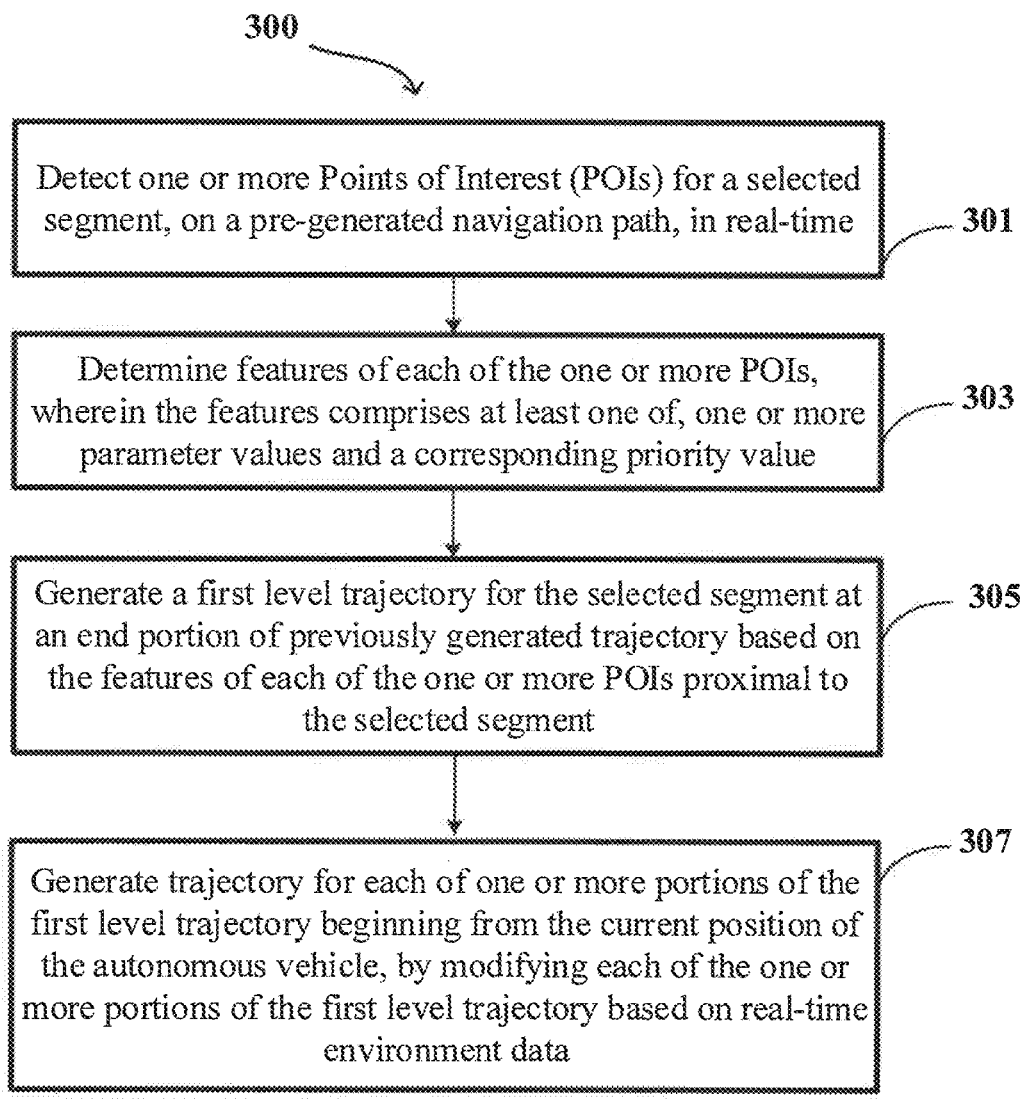
FIG. 3 shows a flowchart illustrating a method of generating a trajectory for navigating an autonomous vehicle in accordance with some embodiments of the present disclosure.

FIG. 3 shows a flowchart illustrating a generating a trajectory for navigating an autonomous vehicle in accordance with some embodiments of the present disclosure.

As illustrated in FIG. 3, the method 300 includes one or more blocks illustrating a method of generating a trajectory for navigating an autonomous vehicle 101. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include detecting, by a processor 109 of the trajectory generating system 107, one or more Points of Interest (POIs) for a selected segment, on a pre-generated navigation path, in real-time. In some embodiments, the selected segment may be at a predefined distance from current position of the autonomous vehicle 101. In some embodiments, the processor 109 may detect one or more POIs using a map database 103 associated with the trajectory generating system 107, including a plurality of annotated vectors related to infrastructure information.

At block 303, the method 300 may include determining, by the processor 109, features of each of the one or more POIs. In some embodiments, the features may include, but not limited to, one or more parameter values and a corresponding priority value for each of the one or more POIs. In some embodiments, the priority value may be pre-determined based on impact of the corresponding one or more POIs on navigation of the autonomous vehicle 101, and the one or more parameter values are determined using the map database 103.

At block 305, the method 300 may include, generating, by the processor 109, a first level trajectory for the selected segment at an end portion of previously generated trajectory based on the features of each of the one or more POIs proximal to the selected segment, in real-time. In some embodiments, the processor 109 may generate the first level trajectory by mapping the features of each of the one or more POIs with a pretrained decision tree.

At block 307, the method 300 may include, generating, by the processor 109, a second level trajectory for one or more portions of the first level trajectory beginning from the current position of the autonomous vehicle 101, by modifying each of the one or more portions of the first level trajectory based on real-time environment data. In some embodiments, the processor 109 may generate the first level trajectory consecutively extending end portion of the first level trajectory based on location of the one or more POIs. In some embodiments, the processor 109 may extend the first level trajectory parallelly when the second level trajectory is being generated in front of the autonomous vehicle 101. Extended segment of the first level trajectory may act as a subsequent first level trajectory on the pre-generated navigation path.

Figure 4:
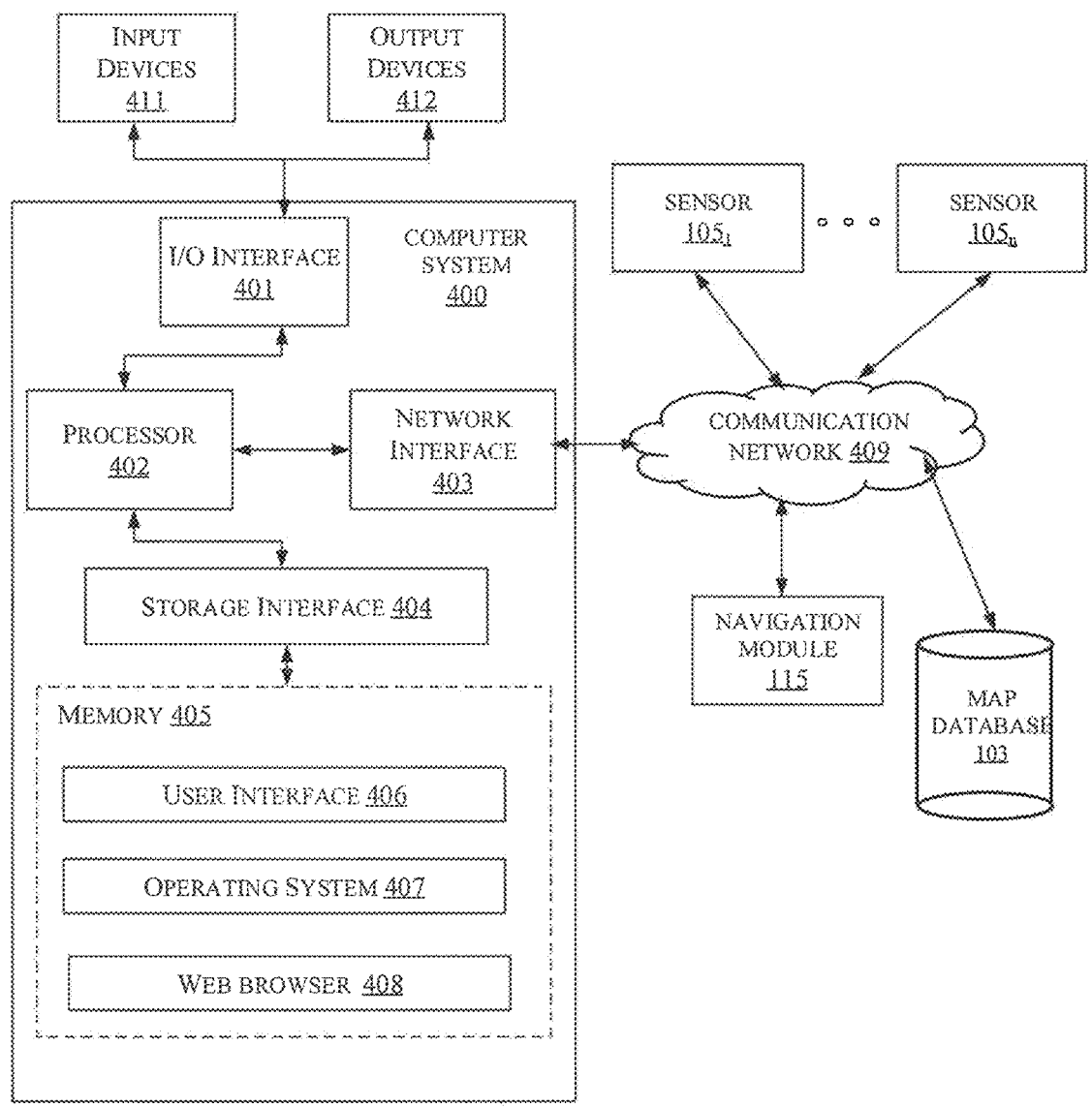
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be trajectory generating system 107 that is used for generating a trajectory for navigating an autonomous vehicle 101. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sensors 105 ($105_1$ up to $105_n$), a map database 103 and a navigation module 115. As an example, the one or more sensors 105 may include, but not limited to, Light Detection and Ranging (LIDAR) system, image capturing devices and Global Positioning System (GPS). Further, the communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XPI, VISTA®/7/8, 10 etc.), APPLE® LOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure provides a method and a system for generating a trajectory for navigating an autonomous vehicle.

The present disclosure utilizes static infrastructure information which is present in map database which is communicatively interfaced with the trajectory generating system, for generating a first level trajectory. The first level trajectory is generated when the autonomous vehicle is at a predefined distance from the selected segment where the first level trajectory is determined. This first level trajectory sets a base and a velocity threshold for the navigation of the autonomous vehicle. Therefore, when the autonomous vehicle is at the selected segment, a second level trajectory may be generated complying with the velocity threshold, by modifying the first level trajectory based on real-time environment data. This two-level trajectory generation ensures that the autonomous vehicle is well prepared to face the infrastructural conditions such as humps, railway crossing, market zone and the like even before encountering the infrastructural conditions.

Further, the beforehand planning of the trajectory eliminates sudden velocity changes to the autonomous vehicle, thereby increasing life of the vehicle parts and avoiding frequent jerks experienced by the vehicle.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a trajectory for navigating an autonomous vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 101 | Autonomous vehicle |
| 103 | Map database |
| 105 | One or more sensors |
| 107 | Trajectory generating system |
| 109 | Processor |
| 111 | I/O interface |
| 113 | Memory |
| 115 | Navigation module |
| 203 | Data |
| 205 | Modules |
| 207 | Point Of Interest (POI) data |
| 209 | Feature data |
| 211 | First level trajectory data |
| 213 | Real-ime environment data |
| 215 | Second level trajectory data |
| 217 | Other data |
| 221 | Detecting module |
| 223 | Feature determining module |
| 225 | First level trajectory generating module |
| 227 | Second level trajectory generating module |
| 229 | Other modules |
| 233 | Exemplary pre-generated navigation path |
| 235 | Exemplary segment 1 of exemplary first level trajectory 239 |
| 239 | Exemplary first level trajectory of the selected segment |
| 241a-241d | Exemplary POIs |
| 243a | Root node of the pre-trained decision tree |
| 243b and 243c | Nodes at Level 1 of the pre-trained decision tree |
| 243d and 243e | Nodes at Level 2 of the pre-trained decision tree |
| 245 | Exemplary new or subsequent segment 1 |
| 247 | Exemplary new or subsequent first level trajectory (also referred as extended segment) |
| 249 | Exemplary new or extended portion |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

What is claimed is:

1. A computer-implemented method of generating a trajectory for navigating an autonomous vehicle, the method comprising:

detecting, by a trajectory generating system that comprises a processor and is associated with the autonomous vehicle, one or more Points of Interest (POIs) for a selected segment, on a pre-generated navigation path, in real-time, wherein the selected segment is at a predefined distance from a current position of the autonomous vehicle, and wherein the pre-generated navigation path is generated based on a source point and a destination point;

determining, by the trajectory generating system, an impact of the one or more POIs on navigation of the autonomous vehicle;

determining, by the trajectory generating system, features of each of the one or more POIs based on the impact of the one or more POIs on the navigation of the autonomous vehicle, wherein the features comprise at least one of one or more parameter values and a priority value corresponding to the one or more parameter values;

detecting, by the trajectory generating system, a previous segment prior to the selected segment, wherein the previous segment has a previously generated trajectory;

generating, by the trajectory generating system, a first level trajectory for the selected segment at an end portion of the previously generated trajectory based on the features of each of the one or more POIs for the selected segment, in real-time, wherein the first level trajectory comprises a velocity-acceleration plan that acts as a threshold velocity and a threshold acceleration set for the autonomous vehicles and wherein the first level trajectory is generated for the selected segment when the autonomous vehicle is navigating through the previously generated trajectory for the previous segment;

acquiring, by the trajectory generating system, real-time environment data indicating a real-time situation along the selected segment;

determining, by the trajectory generating system, one or more portions of the first level trajectory which is visible for Field Of View (FOV) of one or more sensors associated with the autonomous vehicle;

generating, by the trajectory generating system, a second level trajectory for the one or more portions of the first level trajectory beginning from the current position of the autonomous vehicle, by modifying each of the one or more portions of the first level trajectory based on the real-time environment data; and transmitting, by the trajectory generating system, the second level trajectory to a navigation module associated with the trajectory generating system to determine a command velocity for navigating the autonomous vehicle.

2. The method as claimed in claim 1, wherein the first level trajectory is generated by mapping the features of each of the one or more POIs with a pretrained decision tree.

3. The method as claimed in claim 1, wherein an end portion of the first level trajectory is extended based on one or more locations of the one or more POIs when the second level trajectory is being generated in front of the autonomous vehicle, wherein an extended segment of the first level trajectory is a subsequent first level trajectory on the pre-generated navigation path.

4. The method as claimed in claim 1, wherein the one or more POIs are detected using a map database associated with the trajectory generating system, comprising a plurality of annotated vectors related to infrastructure information.

5. The method as claimed in claim 1, wherein the one or more POIs comprise at least one of sign boards, symbols and images related to infrastructure information along the pre-generated navigation path.

6. The method as claimed in claim 1, wherein the priority value is directly proportional to the impact of the one or more POIs on the navigation of the autonomous vehicle.

7. The method as claimed in claim 1, wherein the priority value is pre-determined based on the impact of the one or more POIs on the navigation of the autonomous vehicle, and the one or more parameter values are determined using a map database associated with the trajectory generating system.

8. The method as claimed in claim 1, wherein each of the one or more POIs is associated with corresponding one or more parameters.

9. The method as claimed in claim 1, wherein the second level trajectory is generated by modifying the velocity-acceleration plan of the first level trajectory based on the real-time environment data in such a way that a velocity and an acceleration of the second level trajectory do not exceed the threshold velocity and the threshold acceleration of the first level trajectory, respectively.

10. A trajectory generating system for generating a trajectory for navigating an autonomous vehicle, the trajectory generating system comprising:

a processor; and a memory communicatively coupled to the processor, wherein the memory stores processor-executable instructions, which, on execution, cause the processor to:

detect one or more Points of Interest (POIs) for a selected segment, on a pre-generated navigation path, in real-time, wherein the selected segment is at a predefined distance from a current position of the autonomous vehicle, and wherein the pre-generated navigation path is generated based on a source point and a destination point;

determine an impact of the one or more POIs on navigation of the autonomous vehicle;

determine features of each of the one or more POIs based on the impact of the one or more POIs on the navigation of the autonomous vehicle, wherein the features comprise at least one of one or more parameter values and a priority value corresponding to the one or more parameter values;

detect a previous segment prior to the selected segment, wherein the previous segment has a previously generated trajectory;

generate a first level trajectory for the selected segment at an end portion of the previously generated trajectory based on the features of each of the one or more POIs for the selected segment, in real-time, wherein the first level trajectory comprises a velocity-acceleration plan that acts as a threshold velocity and a threshold acceleration set for the autonomous vehicle, and wherein the first level trajectory is generated for the selected segment when the autonomous vehicle is navigating through the previously generated trajectory for the previous segment;

acquire real-time environment data indicating a real-time situation along the selected segment;

determine one or more portions of the first level trajectory which is visible for Field Of View (FOV) of one or more sensors associated with the autonomous vehicle;

generate a second level trajectory for one or more portions of the first level trajectory beginning from the current position of the autonomous vehicle, by modifying each of the one or more portions of the first level trajectory based on the real-time environment data; and transmit the second level trajectory to a navigation module associated with the trajectory generating system to determine a command velocity for navigating the autonomous vehicle.

11. The trajectory generating system as claimed in claim 10, wherein the processor generates the first level trajectory by mapping the features of each of the one or more POIs with a pretrained decision tree.

12. The trajectory generating system as claimed in claim 10, wherein the processor extends an end portion of the first level trajectory based on one or more locations of the one or more POIs when the second level trajectory is being generated in front of the autonomous vehicle, wherein an extended segment of the first level trajectory is a subsequent first level trajectory on the pre-generated navigation path.

13. The trajectory generating system as claimed in claim 10, wherein the processor detects the one or more POIs using a map database associated with the trajectory generating system, comprising a plurality of annotated vectors related to infrastructure information.

14. The trajectory generating system as claimed in claim 10, wherein the one or more POIs comprise at least one of sign boards, symbols and images related to infrastructure information along the pre-generated navigation path.

15. The trajectory generating system as claimed in claim 10, wherein the priority value is directly proportional to the impact of the one or more POIs on the navigation of the autonomous vehicle.

16. The trajectory generating system as claimed in claim 10, wherein the priority value is pre-determined based on the impact of the one or more POIs on the navigation of the autonomous vehicle, and the processor determines the one or more parameter values using a map database associated with the trajectory generating system.

17. The trajectory generating system as claimed in claim 10, wherein each of the one or more POIs is associated with corresponding one or more parameters.

18. A non-transitory computer readable medium including instructions stored thereon that when processed by at least one processor cause a trajectory generating system to perform operations comprising:

detecting one or more Points of Interest (POIs) for a selected segment, on a pre-generated navigation path, in real-time, wherein the selected segment is at a predefined distance from a current position of an autonomous vehicle, and wherein the pre-generated navigation path is generated based on a source point and a destination point;

determining an impact of the one or more POIs on navigation of the autonomous vehicle;

determining features of each of the one or more POIs based on the impact of the one or more POIs on the navigation of the autonomous vehicle, wherein the features comprise at least one of one or more parameter values and a priority value corresponding to the one or more parameter values;

detecting a previous segment prior to the selected segment, wherein the previous segment has a previously generated trajectory;

generating a first level trajectory for the selected segment at an end portion of the previously generated trajectory based on the features of each of the one or more POIs for the selected segment, in real-time, wherein the first level trajectory comprises a velocity-acceleration plan that acts as a threshold velocity and a threshold acceleration set for the autonomous vehicle, and wherein the first level trajectory is generated for the selected segment when the autonomous vehicle is navigating through the previously generated trajectory for the previous segment;

acquiring real-time environment data indicating a real-time situation along the selected segment;

determining one or more portions of the first level trajectory which is visible for Field Of View (FOV) of one or more sensors associated with the autonomous vehicle;

generating a second level trajectory for one or more portions of the first level trajectory beginning from the current position of the autonomous vehicle, by modifying each of the one or more portions of the first level trajectory based on the real-time environment data; and transmitting the second level trajectory to a navigation module associated with the trajectory generating system to determine a command velocity for navigating the autonomous vehicle.

* * * * *